Aug. 10, 1937.   G. E. JONES, JR., ET AL   2,089,208
SPRING BUMPER
Filed Nov. 17, 1932   2 Sheets-Sheet 1
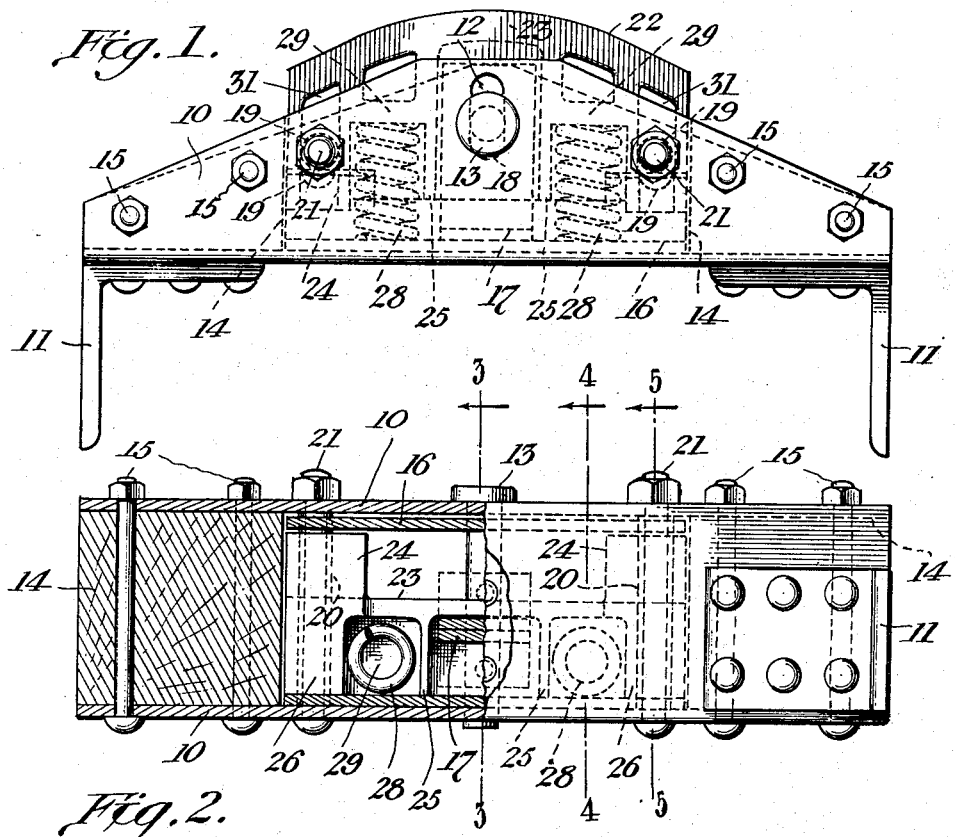
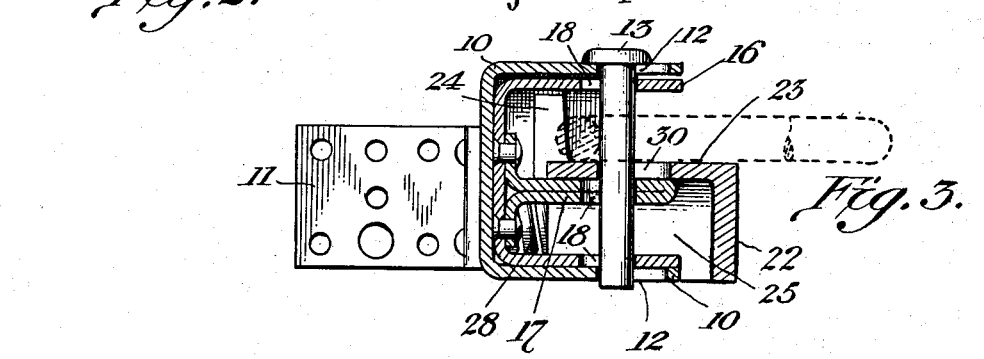
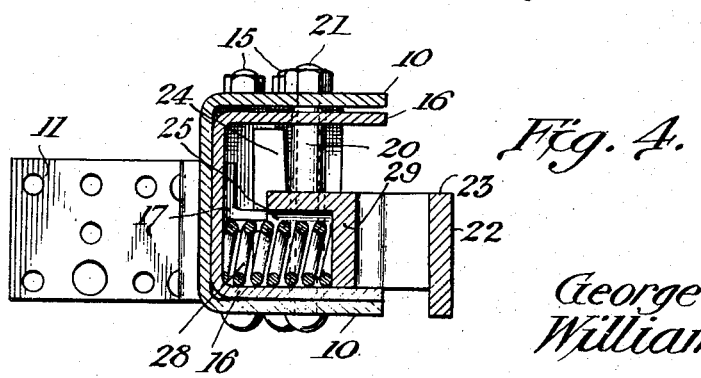
Inventors,
George E. Jones, Jr. &
William A. Bowman.
By
Attorneys.

Aug. 10, 1937.  G. E. JONES, JR., ET AL  2,089,208
SPRING BUMPER
Filed Nov. 17, 1932   2 Sheets-Sheet 2
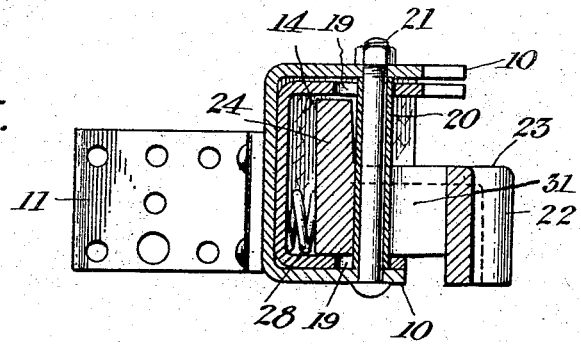
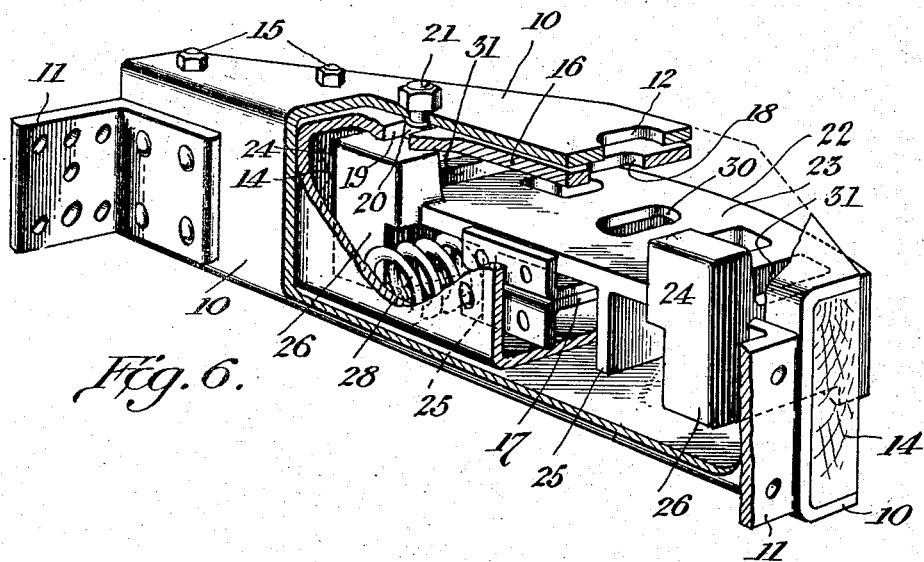
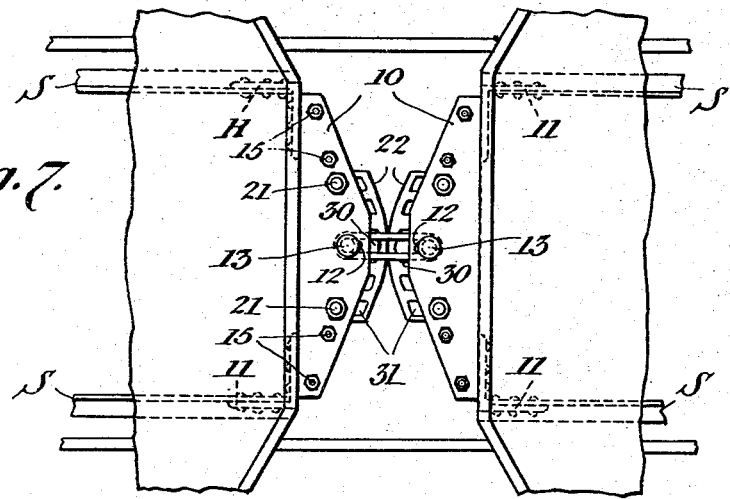
Inventor
George E. Jones, Jr. &
William A. Bowman
By
Attorneys.

Patented Aug. 10, 1937

2,089,208

UNITED STATES PATENT OFFICE 2,089,208

SPRING BUMPER

George E. Jones, Jr., and William A. Bowman, Knoxville, Tenn., assignors to The Sanford Investment Company, Wilmington, Del., a corporation of Delaware Application November 17, 1932, Serial No. 643,088

26 Claims. (Cl. 213—9)

This invention relates to improvements in spring bumpers, and more particularly concerns a construction of such a bumper for employment with mine and similar industrial cars employing link and pin couplings.

One of the features of the present invention is the provision of a spring bumper assembly which may be made up of simple parts formed as castings and plate metal members, with an outer plate metal housing for receiving and protecting the parts relatively movable with respect thereto.

Another feature of the present invention is the provision of a spring bumper construction in which separate members are provided for operation under bumping and traction strains, directly associated with a spring which is compressed in one direction under traction strains and in the opposite direction under bumping strains.

A further feature of the present invention is the provision of a spring bumper construction in which are provided a slotted housing, a slotted coupler or draft member, and a slotted bumper member, with aligned slots through which may pass a coupling pin, so that the coupling pin may transmit traction strains to said coupler member and thereby to a spring, while bumping strains may be transmitted from said bumper member directly to said spring and while the bumper member is moving with respect to said coupling pin.

With these and other objects in view as will appear in the course of the following specification and claims, an illustrative form of construction of the spring bumper according to this invention is set out in the accompanying drawings, in which:

Figure 1 is a plan view of the bumper.

Figure 2 is a rear elevation of the spring bumper assembly with parts broken away to show their inter-relationship of the several elements.

Figures 3, 4 and 5 are respectively vertical longitudinal sections through the same substantially on line 3—3, 4—4 and 5—5 of Figure 2.

Figure 6 is a perspective view, partly broken away and showing the parts in their relative positions.

Figure 7 is a plan view, on a smaller scale, showing the interconnection of two vehicles having such bumpers thereon.

In the drawings, a plate metal housing 10 of channel form, preferably has its horizontal edges cut away at an angle to afford clearance between adjacent vehicles while passing around curves. Externally on the face of the channel housing which is directed inwardly or toward the vehicle body, are riveted the connecting angle pieces 11 by which the bumper structure is secured to the vehicle sills S (Figure 7), for example. Along the central-upright longitudinal plane, the channel is provided with aligned slots 12 for receiving the coupling pin 13, and permitting movement of the coupling pin under traction strains as will be described hereinafter. Within the channel housing, spaced apart and at the ends thereof, are provided wooden filler blocks 14 which leave a central cavity for the reception of the movable elements. These fillers serve to prevent mere edge contact and/or overriding of the channel flanges on adjacent cars while passing around curves in train.

Within the channel housing, and adapted to slide in the longitudinal direction of the vehicle, is disposed a coupler or draft member 16 which likewise is preferably formed of metal plate and is of channel form. Within it is located a T-shaped intermediate web 17 which is securely riveted to the upright wall of the channel member (Figure 3) and thus forms a rigid structure therewith. Aligned slots 18 are provided in the coupler member and its web, in the central upright plane of the bumper (Figure 3) so that the coupler member may move relatively away from the car body within the channel housing. In the illustrated form, further slots are provided in the top and bottom flanges of the coupler member (Figure 5) to receive the spacer sleeves 20 which extend between the flanges of the channel housing, and are held fixedly in position, by the bolts 21 passed therethrough, to serve as stops for limiting the movement of certain of the parts, as will be described hereinafter.

Within the coupler member is provided a bumper member, usually a casting, having an upright buffer face 22, a horizontal shelf portion 23, and the upstanding rearward guide and stop lugs 24. As shown in Figures 1, 2 and 6, the intermediate web 17 is much narrower than the width of the cavity between the filler blocks 14, and downwardly extending walls 25 are provided on the shelf 23 to cooperate with the coupler member in guiding the bumper member for substantially lengthwise movement with respect to the vehicle. The bumper member is likewise provided (Figures 2 and 6) with downwardly extending walls 26 adjacent its sides, so that recesses are provided which are open toward the rear and the bottom for receiving the springs 28, which bear at their ends against the inner upright wall of the coupler member 16, and against a wall 29 at the front end of each such recess (Figure 4), so that the coupler member and the bumper member are at all times forced apart by the springs. The shelf portion 23 of the bumper member is provided in the aforesaid central vertical plane with a slot 30 (Figure 3) through which the coupling pin may pass. The shelf portion 23 of the bumper member is also provided with slots 31 (Figures 5 and 6) for the reception of the spacer collars 20. Thus, the action of the springs 28 in forcing the members apart is to engage the upright wall of the coupler member with the upright wall of the housing, and the left-hand end walls of the slots 31 of the bumper member with bolts 21, so that the extension movements of the spring are limited.

When the bumper is employed on a mine or similar industrial car, for example, two of the cars may be brought together so that their upright buffer faces 22 come in contact. Each car then produces a reaction in the other car by which the bumper member is moved inwardly in such car, directly compressing the springs 28, and absorbing the shock of impact. Ultimately, the bumper member moves until the rear surfaces of the lugs 26 encounter the inner upright surface of the coupler member 16, and thereafter pushing strains are directly transmitted from the bumper member, through the coupler member, to the channel housing, and thus to the vehicle itself.

Two such vehicles may be assembled in a train by employing a coupling link resting upon the shelf portions 23 on each car, and engaged by the coupling pins 13 thereof (Figure 7). In traction, movement is then transmitted through the link from one car to another. Such a pull operates on each car to move the coupling pin 13 relatively to the right in Figure 3, dragging therewith the coupler member 16 while the coupling pin 13 travels in the slots 12. This movement of the coupler member 16 causes a compression of the springs 28, which react at their other ends against the walls 29 of the bumper member which is held against movement, during this traction, by the engagement of the left-hand end walls (Figure 5) of the slots 31 with the spacer collars 20. Thus the shock on sudden traction is absorbed by the springs 28, until the coupling pin 13 of this car has engaged the right-hand end walls of the slots 12 and 30 (Figure 3), after which the traction is transmitted directly from the link, through the coupling pin, to the channel housing 10, and thus to the vehicle body; and also from the coupling pin to the bumper member, spacer sleeves 20 and bolts 21, to the channel housing 10, and thus to the vehicle body. The draft or traction strains are thus distributed to the housing 10.

It will be noted that the reaction of the springs 28 between the coupler member and the bumper member is limited by the engagement of the bumper member with the stop collars 20, even though the coupling pin 13 is withdrawn, so that coupling and uncoupling of the vehicles is quickly and easily accomplished.

The structure is simply and easily made and repaired, and furnishes positive guides for the several parts during normal operations, and permits the several parts to move with respect to one another in response to traction and pushing strains, and provides for a definite and positive traction or pushing even though the spring members be distorted or broken.

The invention may be modified in many ways without departing from the scope of the appended claims.

Having thus described the invention, what we claim as new and desire to secure by Letters Patent, is:

1. A spring bumper for a vehicle, comprising means for providing a transverse housing having an opening toward the end of the vehicle, a recessed draft member slidable longitudinally of the vehicle in said opening, a bumper member slidable longitudinally of the vehicle in said draft member, a vertical coupling pin passing through apertures in said housing and said members, said housing and members providing an opening for the reception of a coupling link engaged with said pin, and spring means interposed between said members to force said draft member longitudinally toward the vehicle body and said bumper member longitudinally away from the vehicle body.

2. A spring bumper for a vehicle, comprising a transverse channel housing mounted with its channel open toward the end of the vehicle, a draft member slidable longitudinally of the vehicle in said channel housing, a bumper member slidable longitudinally of the vehicle in said draft member, a coupling pin passing through apertures of said housing and members, said housing and members providing an opening for the reception of a coupling link engaged with said pin, and spring means interposed between said members to force said draft member longitudinally toward the vehicle body and said bumper member longitudinally away from the vehicle body.

3. A spring bumper for a vehicle, comprising a transverse channel housing mounted with its channel open toward the end of the vehicle, a channel draft member guided and slidable longitudinally of the vehicle in said channel housing, a bumper member guided and slidable longitudinally of the vehicle in said draft member, a coupling pin passing through apertures in said housing and said members, said housing and members providing an opening for the reception of a coupling link engaged with said pin, and spring means interposed between said members to force said draft member longitudinally toward the vehicle body and said bumper member longitudinally away from the vehicle body.

4. A spring bumper for a vehicle, comprising a transverse channel housing mounted with its channel open toward the end of the vehicle, a channel draft member guided and slidable longitudinally of the vehicle in said channel housing, a bumper member guided and slidable longitudinally of the vehicle in said draft member, a central web portion fixedly connected to said draft member with a web portion located parallel to the flanges thereof, a coupling pin passing through apertures of said housing and members and web portion, said bumper member including a link-receiving shelf, and spring means interposed between said members to force said draft member longitudinally in the direction toward the vehicle body and said bumper member longitudinally away from the vehicle body.

5. A spring bumper for a vehicle, comprising a transverse channel housing mounted with its channel open toward the end of the vehicle, a draft member guided and slidable longitudinally of the vehicle in said channel housing and having upper and lower flanges and a substantially upright wall defining a cavity open toward the end of the vehicle, a bumper member having a link-receiving shelf located in said draft member and intermediate the upper and lower walls of the cavity thereof, a bumper face extending downwardly from said shelf, walls extending downwardly from said shelf to provide spring pockets open toward said draft member, said walls at their lower edges being in guided relationship to said lower flange, upwardly extending guides at the rear of the shelf portion for guidingly engaging the said upper flange, a coupling pin passing through apertures of said housing and members, and spring means located in said pockets and bearing against the said upright wall of the cavity.

6. A spring bumper for a vehicle, comprising a transverse channel housing mounted with its channel open toward the end of the vehicle, a draft member slidable longitudinally of the vehicle in said channel housing, a bumper member slidable longitudinally of vehicle in said draft member, a coupling pin passing through slots of said housing and members, spring means interposed between said members to force said draft member longitudinally in the direction toward the vehicle body and said bumper member longitudinally away from the vehicle body, and stop means engaged fixedly in the channel housing and passing through a slot in the bumper member for limiting the movement of the bumper member longitudinally away from the vehicle body under the action of said spring means.

7. A spring bumper for a vehicle, comprising a transverse channel housing mounted with its channel open toward the end of the vehicle, a draft member slidable longitudinally of the vehicle in said channel housing, a bumper member slidable longitudinally of the vehicle in said draft member, a coupling pin passing through slots of said housing and members, spring means interposed between said members to force said draft member longitudinally in the direction toward the vehicle body and said bumper member longitudinally away from the vehicle body, and stop means engaged fixedly in the channel housing and passing through a slot in the draft member for limiting the movement of the draft member longitudinally away from the vehicle body under tension.

8. A spring bumper for a vehicle, comprising a transverse channel housing mounted with its channel open toward the end of the vehicle, a draft member slidable longitudinally of the vehicle in said channel housing, a bumper member slidable longitudinally of the vehicle in said draft member, a coupling pin passing through slots of said housing and members, spring means interposed between said members to force said draft member longitudinally in the direction toward the vehicle body and said bumper member longitudinally away from the vehicle body, and stop means engaged fixedly in the channel housing and passing through slots in the bumper and draft members for limiting outward movement thereof.

9. A spring bumper for a vehicle, comprising a transverse channel housing mounted with its channel open toward the end of the vehicle, a channel draft member guided and slidable longitudinally of the vehicle in the channel housing, a bumper member guided in and slidable longitudinally of the vehicle in the draft member, a coupling pin passing through slots of said housing and members, spring means interposed between said members for forcing the same apart in the longitudinal direction of the vehicle, and stop means engaged fixedly in the channel housing and passing through slots in said draft and bumper members, said spring means operating to hold the draft member against said channel housing and said bumper member against said stop means.

10. A spring bumper for a vehicle, comprising a transverse channel housing mounted with its channel open toward the end of the vehicle, a channel draft member guided and slidable longitudinally of the vehicle in the channel housing, an intermediate web located in and connected to said draft member and extending parallel to the flanges of the channel in the longitudinal direction of the vehicle, said intermediate web being narrower in the transverse direction of the vehicle than said draft member, a bumper member slidable longitudinally of the vehicle, a coupling pin passing through slots of said housing and members, spring means interposed between said members for forcing the same apart in the longitudinal direction of the vehicle, and stop means engaged fixedly in the channel housing and passing through slots in said draft and bumper members, said spring means operating to hold the draft member against said channel housing and said bumper member against said stop means.

11. An end construction for a mine or like car having spaced longitudinal sill-members, comprising a structure adapted to extend transversely between and be connected to said sill-members and having an upright wall and horizontal guiding means, a draft member slidable longitudinally of the car along said guiding means, a bumper member slidable longitudinally of the car, said members having apertures therein, spring means interposed between said draft and bumper members for forcing them apart and for supporting them against draft and bumping strains respectively, and means connected with said structure and engageable with said draft and bumper members for limiting the movement thereof under the action of said spring means and for preventing the separation of said bumper and draft members and spring means from said structure and including a coupling pin smaller than the apertures and passing through said apertures so that a movement of the pin and draft member during traction thereon may occur relative to said guiding means and bumper member with compression of said spring means and so that a movement of the bumper member during bumping thereon may occur relative to said guiding means, said pin and said draft member with compression of said spring means.

12. A spring bumper for a vehicle, comprising means for providing a transverse housing having an opening toward the end of the vehicle, a draft member slidable longitudinally of the vehicle in said opening, a bumper member slidable longitudinally of the vehicle in said draft member, a coupling pin passing through apertures in said draft and bumper members, said apertures being larger than said coupling pin for permitting relative movements of said members and pin, spring means interposed between said members for forcing said draft member longitudinally toward the vehicle body and said bumper member longitudinally away from the vehicle body, said bumper member having a bumping face extending uninterruptedly from one side of the longitudinal center line of the vehicle to the other, and stop means on said housing means for preventing separation of said members and spring means therefrom.

13. A spring bumper for a vehicle, comprising a transverse channel housing mounted with its channel toward an end of the vehicle, draft and bumper members slidable longitudinally of the vehicle and guided in their sliding movement from said housing, said bumper member having an upright bumping face extending uninterruptedly from one side of the longitudinal center line of the vehicle to the other, spring means interposed between said members for forcing said draft member longitudinally toward the vehicle body and said bumper member longitudinally away from the vehicle body, and stop means retained by said housing for preventing the separation of said members and spring means therefrom.

14. A spring bumper for a vehicle, comprising means for providing a fixed guiding structure on the vehicle, a draft member guided by and slidable longitudinally with respect to said structure, a bumper member slidable longitudinally of the vehicle and having an upright bumping face which extends uninterruptedly from one side of the vehicle to the other, longitudinal center of the vehicle to the other, a coupling pin passing through apertures in said draft and bumper members, said apertures being larger than the coupling pin for permitting relative movement of the members and pin with respect to one another, spring means interposed between said members for forcing said draft member longitudinally toward the vehicle body and said bumper member longitudinally away from the vehicle body, and stop means on the said structure for preventing separation of said members and spring means from said structure.

15. In combination, a railway end sill, a draft beam extending along and arranged to abut a portion of said sill, a buffer beam in front of said draft beam, means spaced apart longitudinally of said sill and anchoring said buffer beam directly to said sill but providing for relative movement between them, springs similarly spaced and compressed between said beams, and an upstanding draw bar pin passing through said beams and having a lost motion connection with both of said beams.

16. In combination, a railway vehicle underframe end sill having outward flanges, and a draft and buffing device between said flanges including a draft member normally seated against said sill, a buffer member opposing said draft member, a spring compressed between said members, projections on said members with overlapping central portions, a draw bar extending transversely of said members and overlapping said projections, there being alined openings through said flanges and the overlapping portions of said projections and said draw bar and other openings through the outer portions of said buffer projection adjacent said springs, a draw bar connecting pin extending through said alined openings and freely movable horizontally relative to said flanges and said buffer projection and normally engaging said draft projection and said draw bar, and anchoring pins rigidly secured in said flanges and extending through and loosely fitting the openings in the outer portions of said buffer member.

17. In combination, a vehicle end sill, a draft beam extending along and arranged to abut a portion of said sill, a buffer beam in front of said draft beam, means spaced apart longitudinally of said sill for limiting the separating movement of said buffer beam relative to said sill but providing for relative inward movement of the buffer beam, springs similarly spaced and compressed between said beams, and a coupling attachment means engaging the draft beam above and below said springs and operating to transmit draft effects to said draft beam.

18. A spring bumper and coupler for a vehicle, comprising bumper and draft members each movable relative to the vehicle frame, spring means interposed between said members for transferring bumping effects from said bumper member to said draft member and draft effects from said draft member to said bumper member, a coupling pin passing through said members and operating to transmit draft effects to said draft member and to limit relative separating movement of said members under the action of said spring means, at least one of said members having an aperture larger than and receiving said coupling pin to permit the relative movement of said pin and members during the transfer of said bumping and draft effects, means secured to the vehicle frame to limit the movement of the draft member during bumping, and means secured to the vehicle frame to limit the movement of the bumper member during draft.

19. A spring bumper and coupler for a vehicle, comprising bumper and draft members each movable relative to the vehicle frame, spring means interposed between said members for transferring bumping effects from said bumper member to said draft member and draft effects from said draft member to said bumper member, a coupling pin passing through said members and operating to transmit draft effects to said draft member and to limit relative separating movement of said members under the action of said spring means, said bumper member having an aperture larger than and receiving said coupling pin to permit the relative movement of said members during the transfer of said bumping and draft effects, means secured to the vehicle frame to limit the movement of the draft member during bumping, and means secured to the vehicle frame to limit the movement of the bumper member during draft.

20. A spring bumper and coupler for a vehicle, comprising bumper and draft members each movable relative to the vehicle frame, spring means interposed between said members for transferring bumping effects from said bumper member to said draft member and draft effects from said draft member to said bumper member, a coupling pin passing through said members and operating to transmit draft effects to said draft member and to limit relative separating movement of said members under the action of said spring means, at least one of said members having an aperture larger than and receiving said coupling pin to permit the relative movement of said members during the transfer of said bumping and draft effects, means secured to the vehicle frame to limit the movement of the draft member during bumping, and laterally spaced stop elements secured to the vehicle frame, said bumper member having apertures larger than and receiving said elements for permitting relative movement of the bumper member toward the vehicle body during bumping and to limit relative movement of the bumper member away from said body during draft.

21. A spring bumper for a vehicle comprising bumping and draft members, spring means interposed between said members to transfer bumping effects from said bumper member to said draft member, a coupling pin passing through said members and operating to transmit draft effects to said draft member and to limit relative separating movement of said members under the action of said spring means, at least one of said members having an aperture larger than and receiving said coupling pin to permit the relative movement of said members during the transfer of said bumping effects, means secured to the vehicle frame to limit the movement of the draft member during bumping, and means secured to the vehicle frame to limit the movement of the bumper member during draft.

22. A spring bumper and coupler for a vehicle, comprising bumper and draft members each movable relative to the vehicle frame, spring means interposed between said members for transferring bumping effects from said bumper member to said draft member and draft effects from said draft member to said bumper member, a coupling attachment means having a part passing through said draft member, said draft member having an aperture larger than and receiving said coupling part to permit the relative movement of said part and member during the transfer of said bumping effects, means secured to the vehicle frame to limit the movement of the draft member during bumping, and means secured to the vehicle frame to limit the movement of the bumper member during draft.

23. In combination with a transverse rigid end-structure of a vehicle, a spring bumper and a draw-head means comprising bumper and draft members, spring means for transferring bumping effects from said bumper member to said draft member and draft effects from said draft member to said bumper member, means rigidly secured to the said transverse end-structure and limiting the outward movement of the said draft member, the said transverse end-structure limiting the inward movement of the said draft member, the said draft member having a substantially upright wall located between the said transverse end-structure and one end of the said spring means, coupling means engaged with the said draft member both above and below the said spring means, so that the draft pull is transmitted in substantially horizontal planes located both above and below the said spring means, and means rigidly secured to the said draft member for limiting the outward movement of the said bumper member.

24. A spring bumper and coupler for a vehicle, comprising bumper and draft members each movable relative to the vehicle frame, said draft member comprising a plate metal channel member formed to present an upright back face and to present upper and lower horizontal flanges directed away from the car frame, spring means interposed between said members for transferring bumping effects from said bumper member to said draft member and draft effects from said draft member to said bumper member, coupling attachment means connected with said draft member, means secured to the vehicle frame to limit the movement of the draft member during bumping, and means secured to the vehicle frame to limit the movement of the bumper member during draft.

25. A spring bumper and coupler as in claim 24, in which the bumper member has a part extending into said draft member and guided thereby for relative movement longitudinally of the vehicle.

26. A spring bumper and coupler as in claim 24, including plate metal guide means secured within the channel draft member for providing a substantially horizontal shelf, said bumper member having a part extending into the draft member and resting on said shelf and guided thereby.

GEORGE E. JONES, Jr.
WILLIAM A. BOWMAN.